(12) United States Patent
Yoshinaga

(10) Patent No.: US 10,843,155 B2
(45) Date of Patent: Nov. 24, 2020

(54) METHOD AND APPARATUS FOR MANUFACTURING EXCREMENT TREATMENT MATERIAL

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 16/530,110

(22) Filed: Aug. 2, 2019

(65) Prior Publication Data
US 2019/0351384 A1    Nov. 21, 2019

Related U.S. Application Data

(63) Continuation of application No. PCT/JP2018/005081, filed on Feb. 14, 2018.

(30) Foreign Application Priority Data

Apr. 6, 2017 (JP) .................................. 2017-075839

(51) Int. Cl.
| | | |
|---|---|---|
| *B01J 2/20* | (2006.01) | |
| *A01K 1/015* | (2006.01) | |
| *B01J 2/00* | (2006.01) | |
| *B01J 20/30* | (2006.01) | |
| *B29B 9/12* | (2006.01) | |
| *B29B 9/16* | (2006.01) | |

(52) U.S. Cl.
CPC .............. *B01J 2/20* (2013.01); *A01K 1/0152* (2013.01); *B01J 2/003* (2013.01); *B01J 20/3028* (2013.01); *B29B 9/12* (2013.01); *B29B 2009/163* (2013.01)

(58) Field of Classification Search
None
See application file for complete search history.

(56) References Cited

U.S. PATENT DOCUMENTS

| | | | |
|---|---|---|---|
| 4,772,430 A | 9/1988 | Sauda et al. | |
| 2013/0078328 A1* | 3/2013 | Brahmandam | B30B 11/221 425/223 |
| 2013/0112150 A1 | 5/2013 | Ellis et al. | |
| 2015/0272078 A1* | 10/2015 | Ikegami | B30B 11/228 264/40.1 |

(Continued)

FOREIGN PATENT DOCUMENTS

| | | |
|---|---|---|
| JP | S61-279524 A | 12/1986 |
| JP | 2006-149210 A | 6/2006 |
| JP | 2007-190026 A | 8/2007 |

(Continued)

OTHER PUBLICATIONS

May 22, 2018 Search Report issued in International Patent Application No. PCT/JP2018/005081.

(Continued)

*Primary Examiner* — Mary Lynn F Theisen
(74) *Attorney, Agent, or Firm* — Oliff PLC

(57) ABSTRACT

A manufacturing apparatus includes a granulation machine. The granulation machine forms granules by performing extrusion granulation on a granulation material. The granulation machine includes a die. In the die, a die hole that allows the granulation material to pass therethrough is formed. An outlet opening surface of the die hole has a polygonal shape.

18 Claims, 19 Drawing Sheets

(56) References Cited

U.S. PATENT DOCUMENTS

2016/0082416 A1* 3/2016 Mochizuki ........... A01K 1/0155
                                                      119/171

FOREIGN PATENT DOCUMENTS

| | | |
|---|---|---|
| JP | 2010-148444 A | 7/2010 |
| JP | 2014-532443 A | 12/2014 |
| JP | 5945087 B1 | 7/2016 |

OTHER PUBLICATIONS

May 22, 2018 Written Opinion issued in International Patent Application No. PCT/JP2018/005081.

* cited by examiner

METHOD AND APPARATUS FOR MANUFACTURING EXCREMENT TREATMENT MATERIAL

CROSS REFERENCE TO RELATED APPLICATION

This is a Continuation of International Application No. PCT/JP2018/005081 filed Feb. 14, 2018, which claims the benefit of Japanese Application No. 2017-075839 filed Apr. 6, 2017. The contents of these applications are hereby incorporated by reference in their entirety.

TECHNICAL FIELD

The present invention relates to a method and an apparatus for manufacturing an excrement treatment material.

BACKGROUND ART

A conventional excrement treatment material is disclosed in, for example, Patent Document 1. The excrement treatment material disclosed in the document is an animal excrement treatment material, and is composed of a plurality of grains that absorb urine. Each grain has a cylindrical shape. The excrement treatment material is used, with the plurality of grains being placed on an animal litter box.

CITATION LIST

Patent Document
Patent Document 1: JP 2007-190026A

SUMMARY OF INVENTION

Technical Problem

When grains as described above are placed in an animal litter box, the grains may spill out of the animal litter box. Also, even after the grains are placed in the animal litter box, an animal may dig and force the grains out of the animal litter box. Because the grains have a cylindrical shape, the grains easily roll around on the floor. For this reason, the conventional excrement treatment material is problematic in that the grains spilled out of an animal litter box scatter over a wide area.

Solution to Problem

The present invention has been made in view of the problem described above, and it is an object of the present invention to provide a method and an apparatus for manufacturing an excrement treatment material that is made of grains that do not easily roll around on the floor.

A method for manufacturing an excrement treatment material according to the present invention includes: a granulation step of forming a granule by performing extrusion granulation on a granulation material using a granulation machine, wherein the granulation machine includes a die in which a die hole that allows the granulation material to pass therethrough is formed, and a first opening surface that is an outlet opening surface of the die hole has a polygonal shape.

According to the manufacturing method described above, a granulation machine is used that includes a die in which a die hole is formed. The outlet opening surface (first opening surface) of the die hole has a polygonal shape. For this reason, from the granulation material that has passed through the die hole, granules that have a rectangular prism shape are obtained. Accordingly, in the manufactured excrement treatment material, grains do not easily roll around on the floor.

Also, an apparatus for manufacturing an excrement treatment material according to the present invention includes: a granulation machine that includes a die in which a die hole that allows a granulation material to pass therethrough is formed, and forms a granule by performing extrusion granulation on the granulation material, wherein a first opening surface that is an outlet opening surface of the die hole has a polygonal shape.

The manufacturing apparatus described above includes a granulation machine that includes a die in which a die hole is formed. The outlet opening surface (first opening surface) of the die hole has a polygonal shape. For this reason, from the granulation material that has passed through the die hole, granules that have a rectangular prism shape are obtained. Accordingly, in the manufactured excrement treatment material, grains do not easily roll around on the floor.

Advantageous Effects of Invention

According to the present invention, it is possible to implement a method and an apparatus for manufacturing an excrement treatment material that is made of grains that do not easily roll around on the floor.

DESCRIPTION OF EMBODIMENTS

Figure 1:
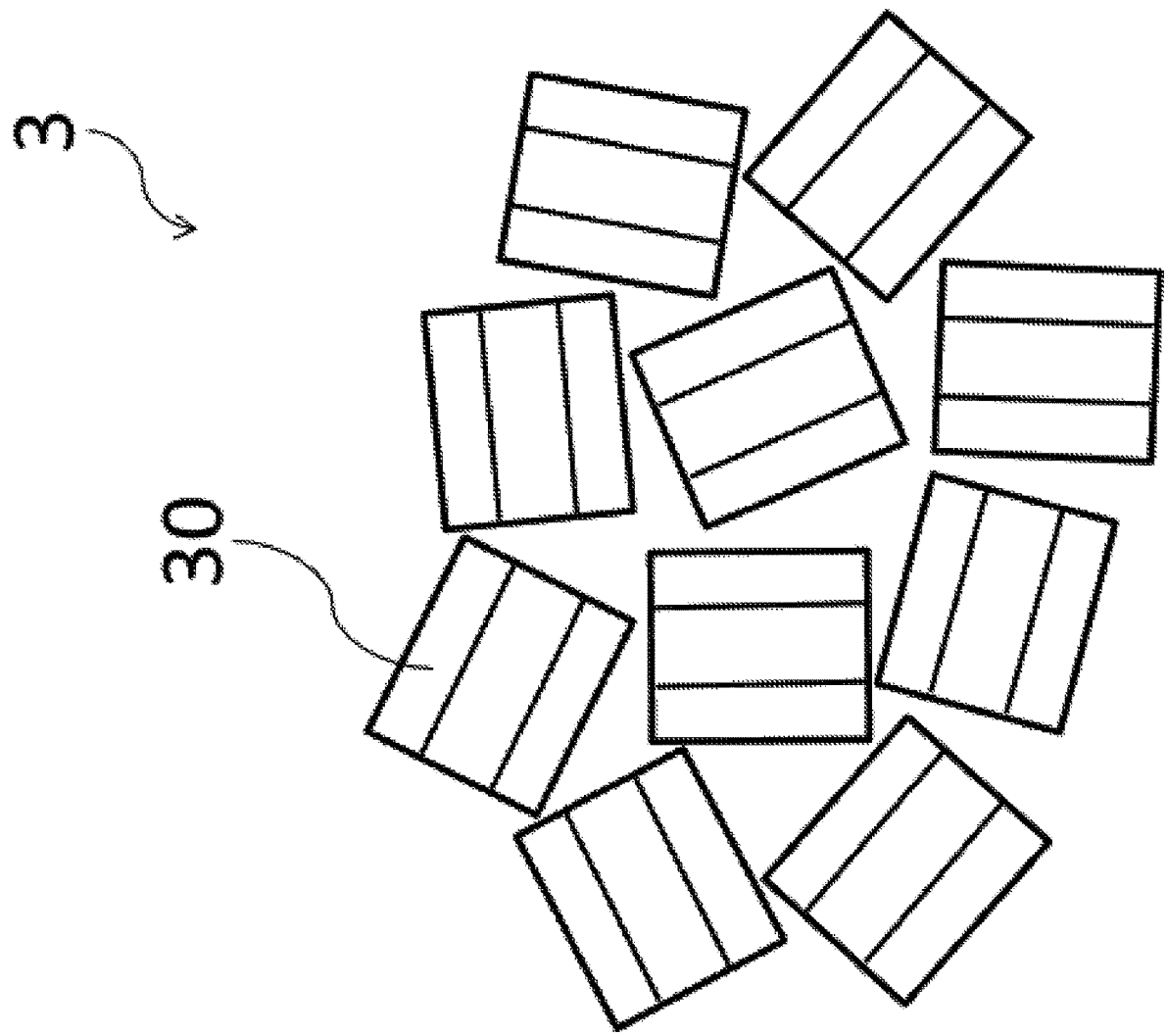
FIG. 1 is a schematic diagram of an excrement treatment material according to an embodiment of the present invention.

Hereinafter, an embodiment of the present invention will be described in detail with reference to the drawings. In the description of the drawings, the same elements are given the same reference numerals, and redundant descriptions will be omitted.

FIG. 1 is a schematic diagram showing an excrement treatment material according to an embodiment of the present invention. An excrement treatment material 3 is composed of a plurality of absorbent grains 30. The excrement treatment material 3 is a material used in the disposal of excrement (in particular, urine) from a human or an animal by absorbing the excrement.

Figure 2:
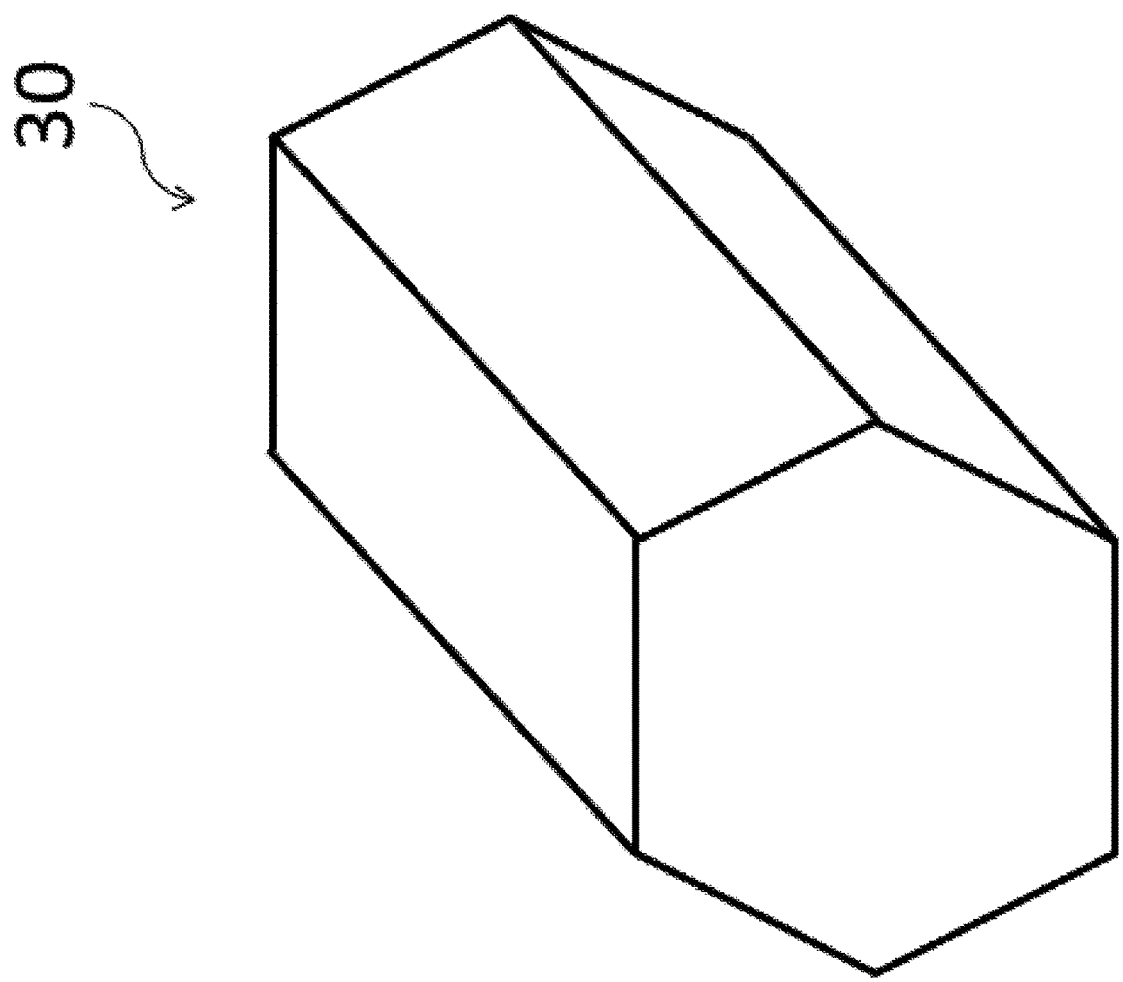
FIG. 2 is a perspective view of a grain 30.
Figure 3:
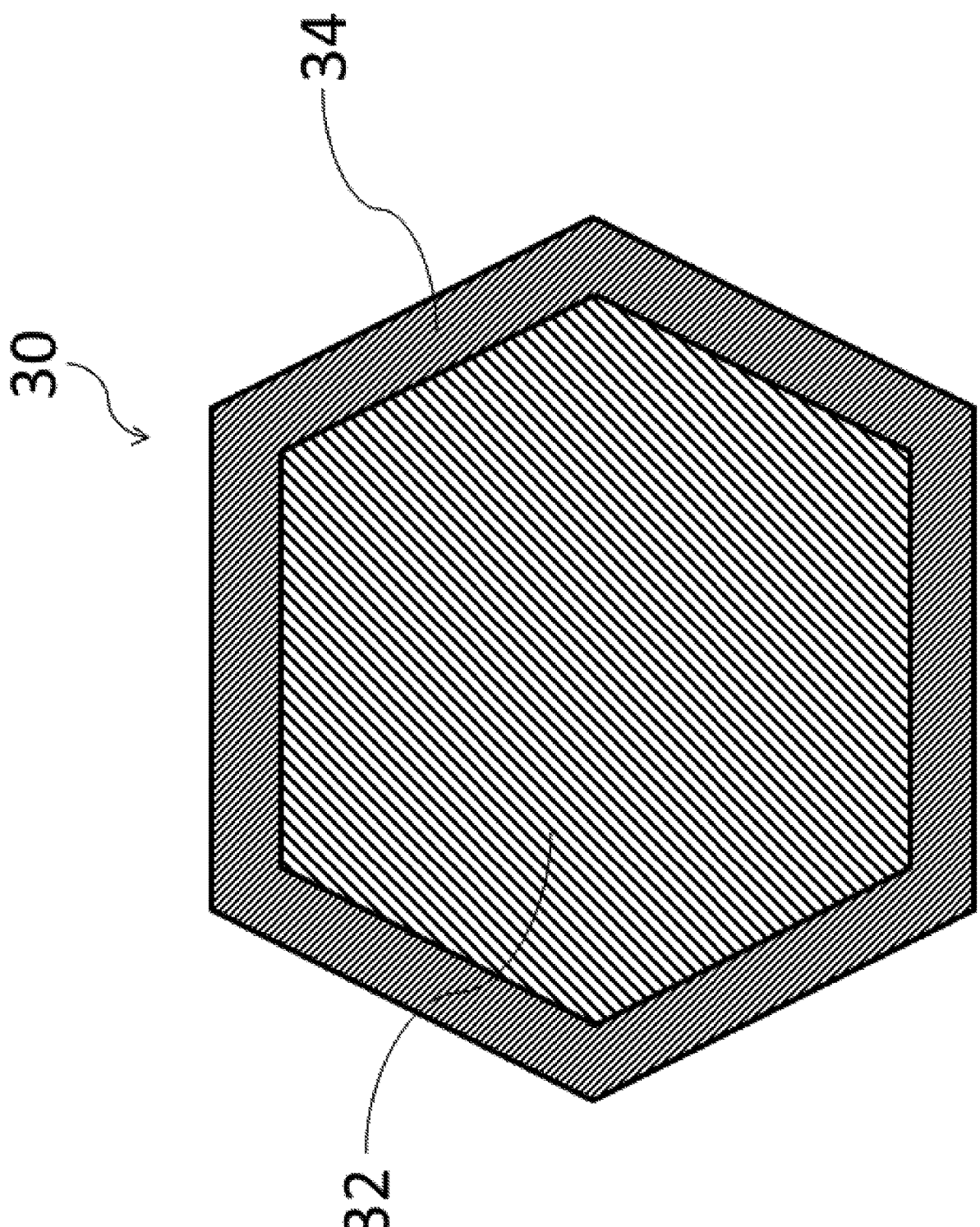
FIG. 3 is a cross-sectional view of the grain 30.

FIG. 2 is a perspective view of a grain 30, and FIG. 3 is a cross-sectional view of the grain 30. The grain 30 has a substantially rectangular prism shape (specifically, a hexagonal prism shape). As can be seen from FIG. 3, the grain 30 includes a core portion 32 (granule) and a coating portion 34. The diagram shows a cross section perpendicular to the height direction of the grain 30. The core portion 32 is molded into a substantially rectangular prism shape. The core portion 32 has a function of absorbing and retaining water from excrement. The main material of the core portion 32 is preferably an organic substance. As used herein, the main material of the core portion 32 refers to one of the materials constituting the core portion 32 that accounts for the highest proportion by weight in the core portion 32. Papers, used tea leaves, plastics, or soybean refuse, for example, can be used as the organic substance.

Papers refer to a material composed mainly of pulp. Examples of papers include ordinary paper, a vinyl chloride wallpaper classified product (paper obtained by classifying vinyl chloride wallpaper), fluff pulp, papermaking sludge, pulp sludge, and the like. A disposable diaper classified product (plastic obtained by classifying disposable diapers), for example, can be used as the plastics. The soybean refuse is preferably dried soybean refuse.

The coating portion 34 covers the core portion 32. In the present embodiment, the coating portion 34 covers the entire surface of the core portion 32. The coating portion 34 preferably has a substantially uniform thickness. The coating portion 34 has a function of bonding grains 30 that have absorbed excrement and clumping them together. The main material of the coating portion 34 is also preferably an organic substance.

The coating portion 34 contains an adhesive material. As the adhesive material, it is possible to use, for example, starch, CMC (carboxymethyl cellulose), PVA (polyvinyl alcohol), dextrin, or a water absorbent polymer.

Figure 4:
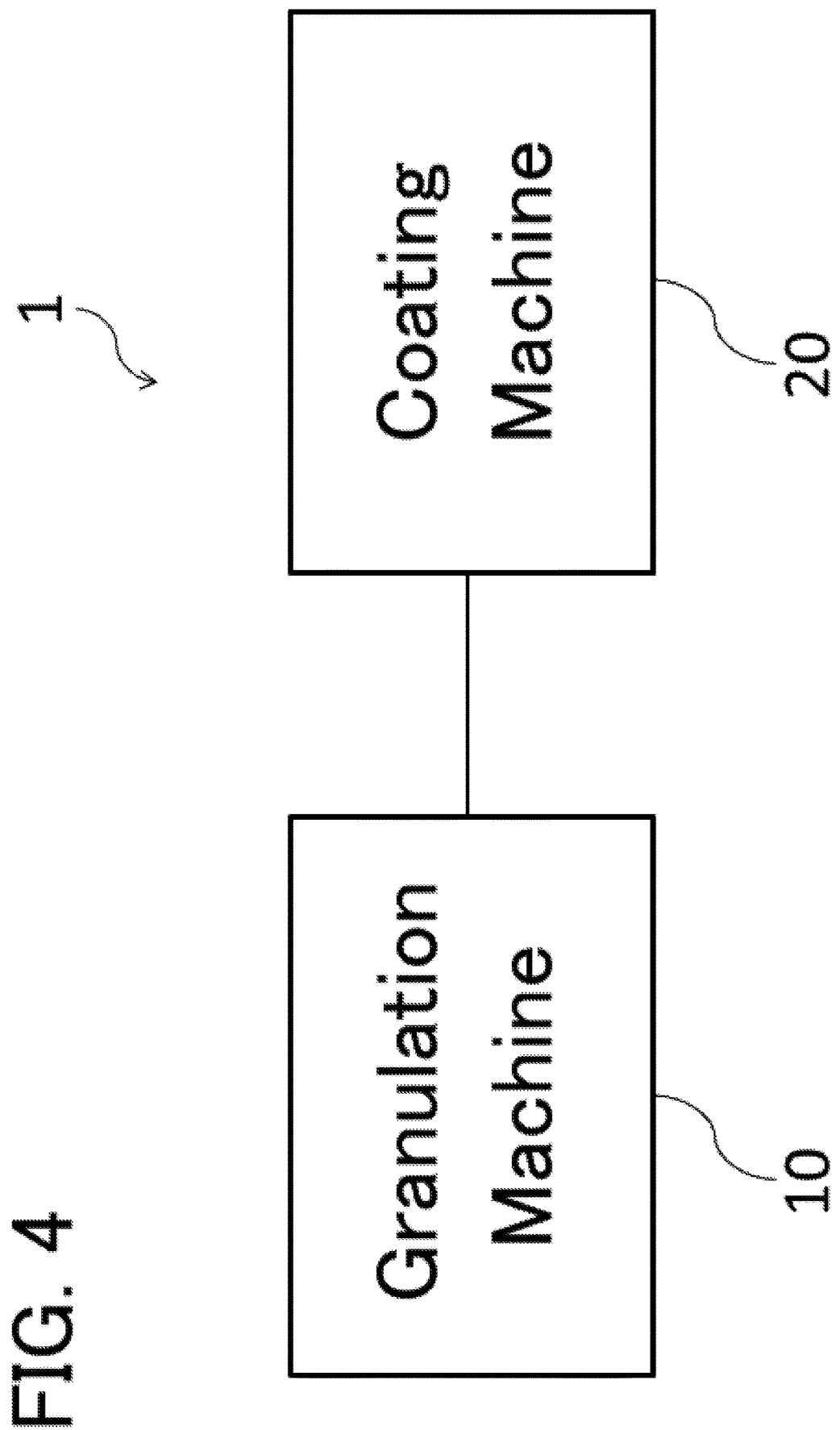
FIG. 4 is a diagram showing a configuration of an apparatus for manufacturing an excrement treatment material according to an embodiment of the present invention.

FIG. 4 is a diagram showing a configuration of an apparatus for manufacturing an excrement treatment material according to an embodiment of the present invention. A manufacturing apparatus 1 is an apparatus for manufacturing the above-described excrement treatment material 3. The manufacturing apparatus 1 includes a granulation machine 10 and a coating machine 20.

Figure 5:
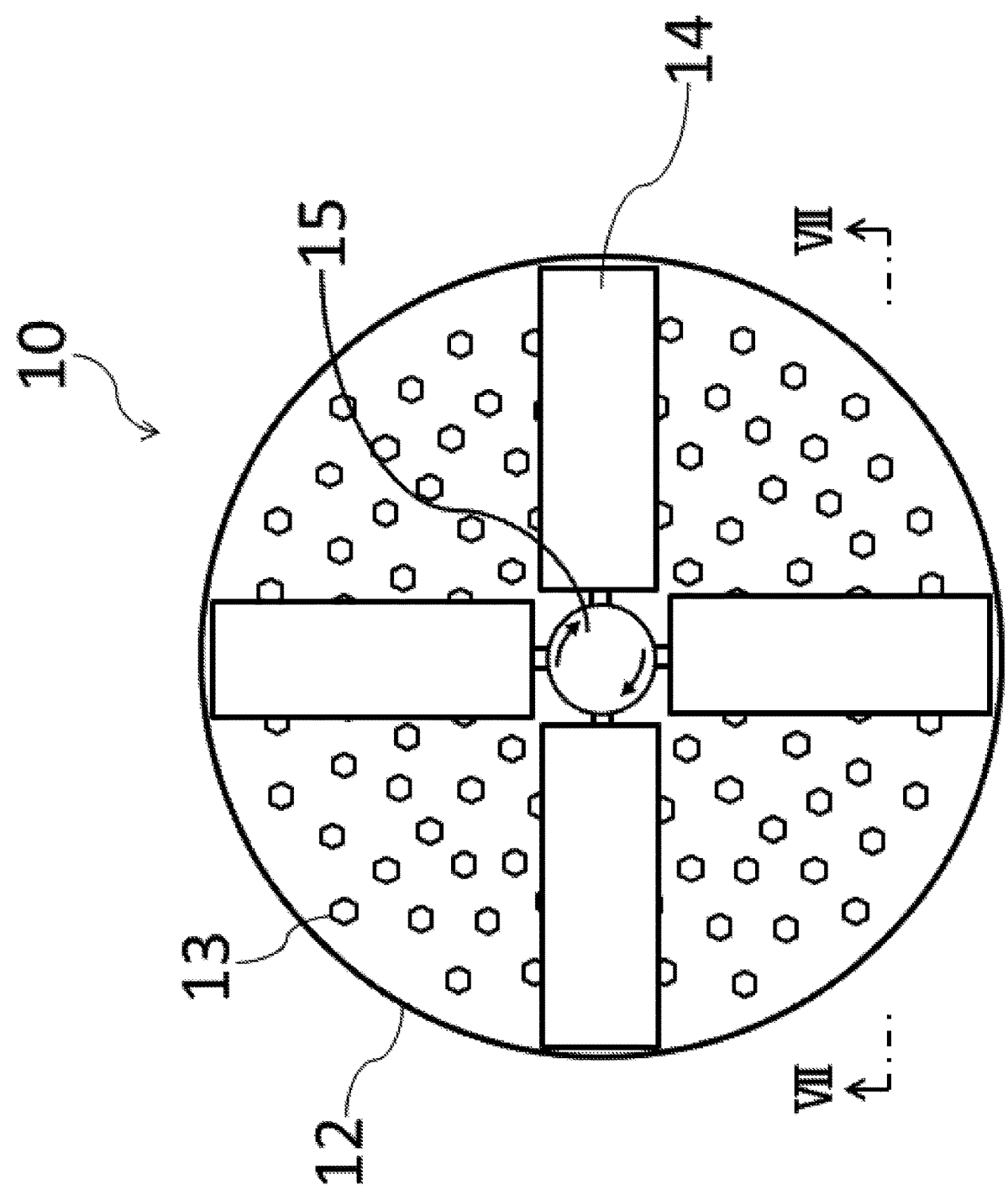
FIG. 5 is a plan view of a granulation machine 10.
Figure 6:
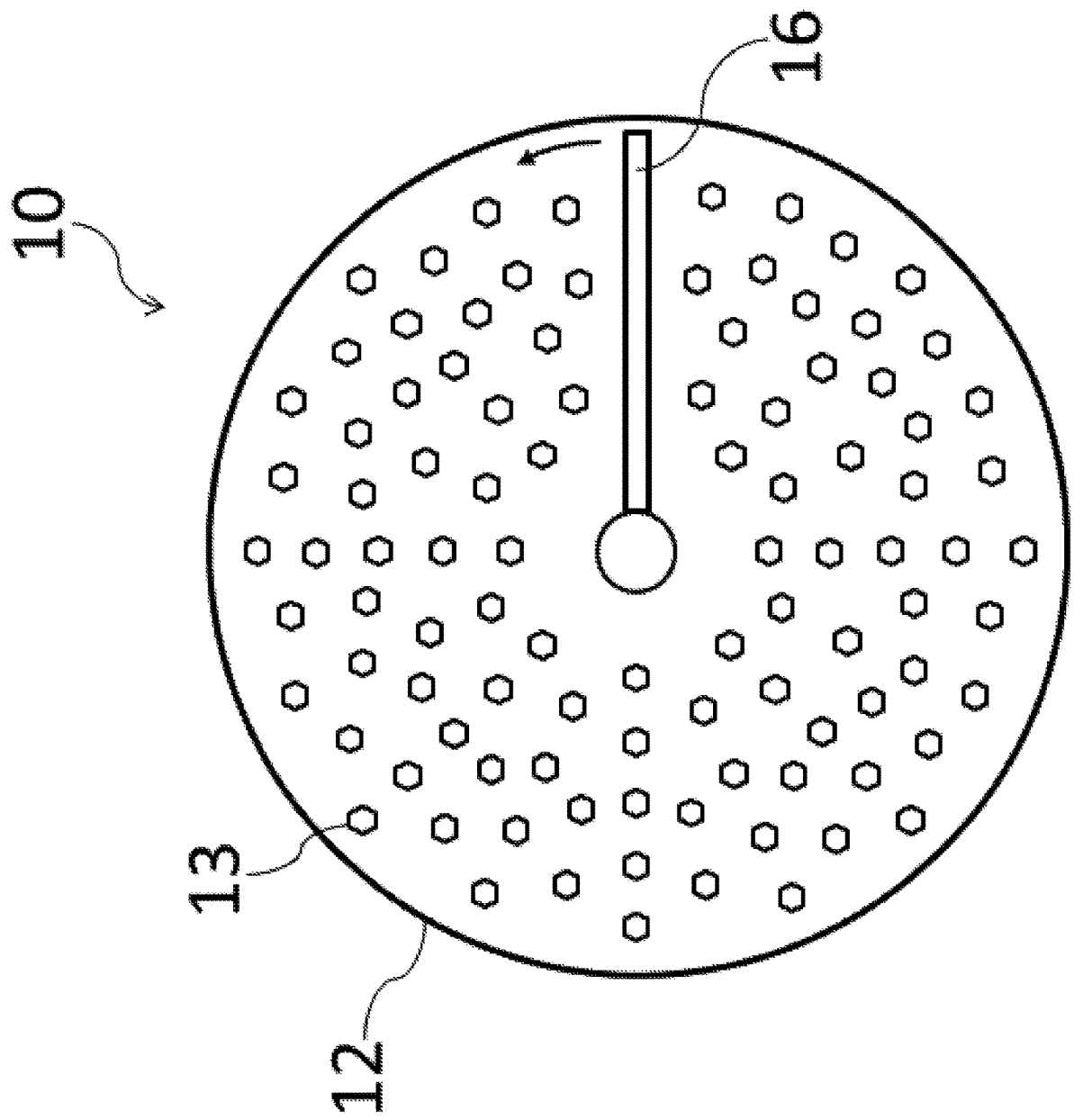
FIG. 6 is a bottom view of the granulation machine 10.
Figure 7:
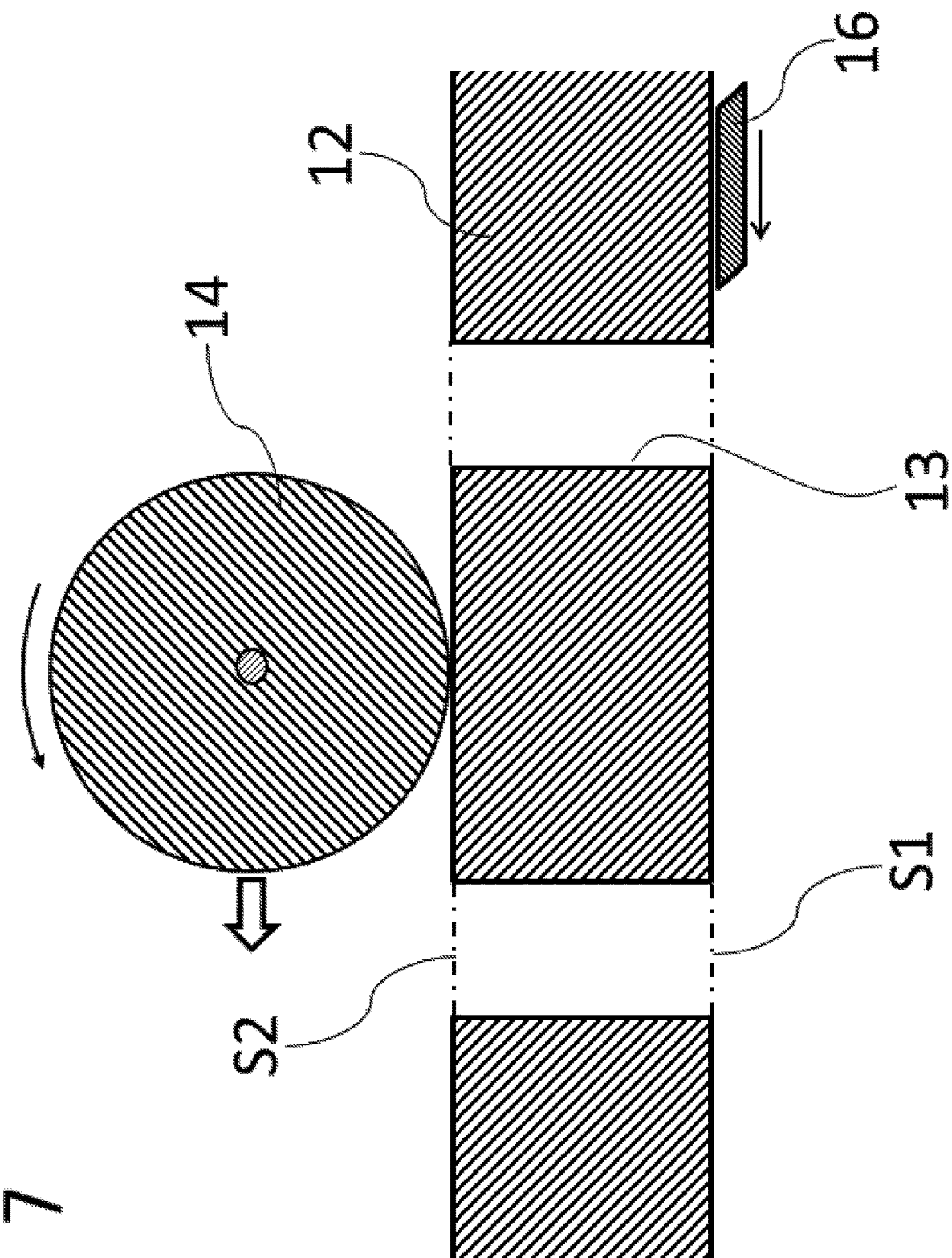
FIG. 7 is a diagram showing a portion of an end face taken along a line VII-VII shown in FIG. 5.

FIG. 5 is a plan view of the granulation machine 10, and FIG. 6 is a bottom view of the granulation machine 10. Also, FIG. 7 is a diagram showing a portion of an end face taken along a line VII-VII shown in FIG. 5. The granulation machine 10 is an extrusion granulation machine that forms a plurality of granules (core portions 32) by performing extrusion granulation on a granulation material (a material for forming the core portions 32). The granulation machine 10 includes a die 12, a roller 14, and a cutter 16. A plurality of die holes 13 that allow the granulation material to pass therethrough are formed in the die 12. The plurality of die holes 13 are distributed substantially over the entire surface of the die 12.

As shown in FIG. 5, the front surface side of the die 12 (the inlet side of the die holes 13) is provided with a roller 14. The roller 14 has a cylindrical shape, and its central axis extends in the radial direction of the die 12. In the present embodiment, a plurality of (specifically, four) rollers 14 are provided. One end of each roller 14 is connected to a rotation axis 15 positioned at a center portion of the front surface of the die 12. The rollers 14 press the granulation material into each of the die holes 13 while revolving about the rotation axis 15. In the present embodiment, each roller 14 revolves about the rotation axis 15 while rotating on its central axis. The rollers 14 can pass over all of the die holes 13 formed in the die 12.

As shown in FIG. 6, the back surface side of the die 12 (the outlet side of the die hole 13) is provided with a cutter 16. The cutter 16 extends in the radial direction of the die 12 from a center portion of the back surface of the die 12. The cutter 16 cuts the granulation material that has been extruded from the die holes 13 while rotating along the back surface of the die 12. To be specific, the cutter 16 is provided so as to be capable of rotating about the center portion of the die 12 within a plane that is parallel to the back surface of the die 12. The cutter 16 is configured to be capable of rotating independently of the roller 14 described above. The cutter 16 can pass over all of the die holes 13 formed in the die 12.

Figure 8:
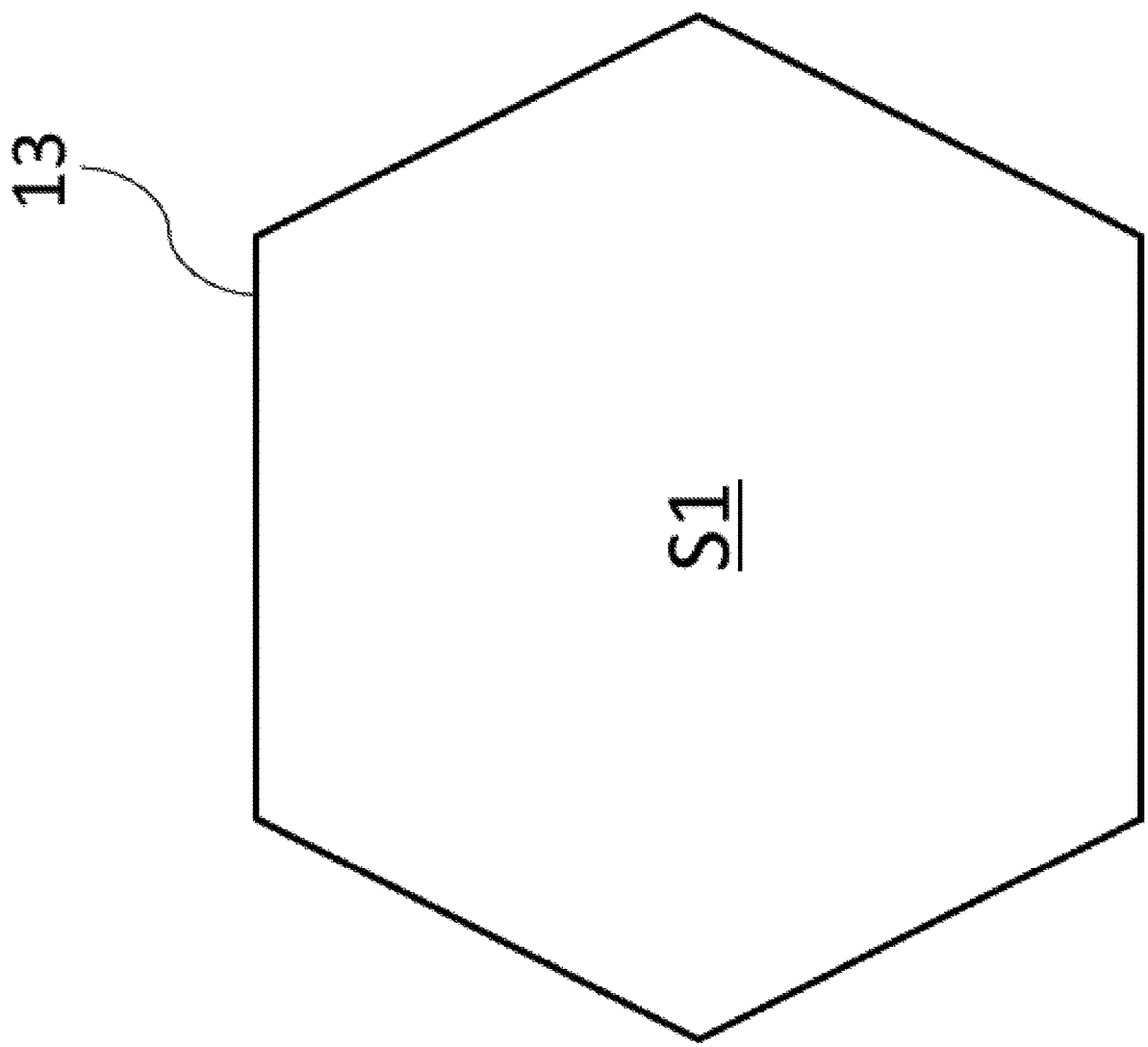
FIG. 8 is an enlarged view of a die hole 13 shown in FIG. 6.
Figure 9:
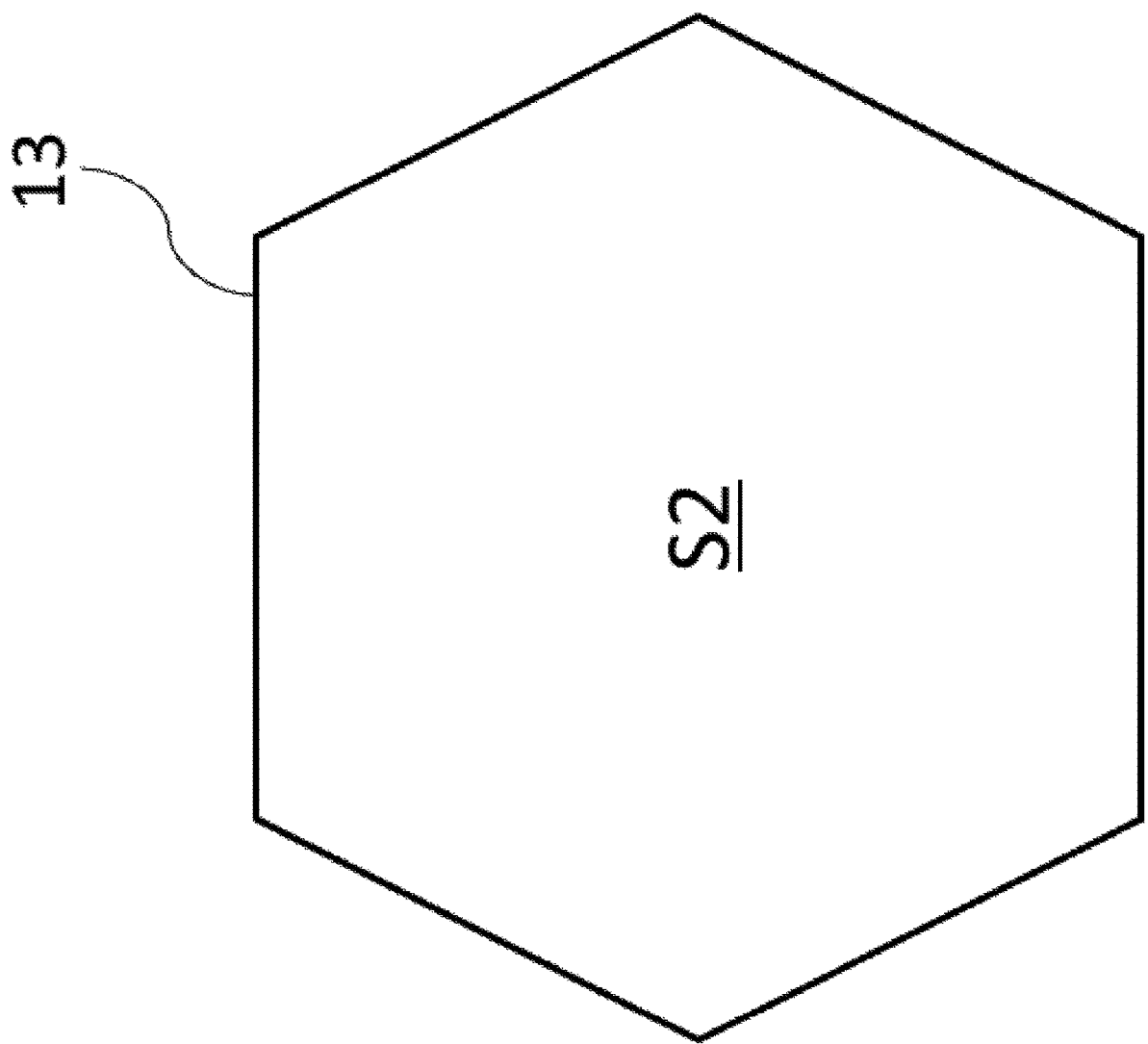
FIG. 9 is an enlarged view of the die hole 13 shown in FIG. 5.

FIG. 8 is an enlarged view of a die hole 13 shown in FIG. 6, and FIG. 9 is an enlarged view of the die hole 13 shown in FIG. 5. As can be seen from FIG. 8, an outlet opening surface S1 (first opening surface) of the die hole 13 has a polygonal shape. In other words, the opening surface S1 has an n-gonal shape (where n is an integer of 3 or more). It is preferable that n is 5 or more. Here, an example is shown in which n is 6. In particular, in the present embodiment, the opening surface S1 has a regular polygonal shape.

Figure 10:
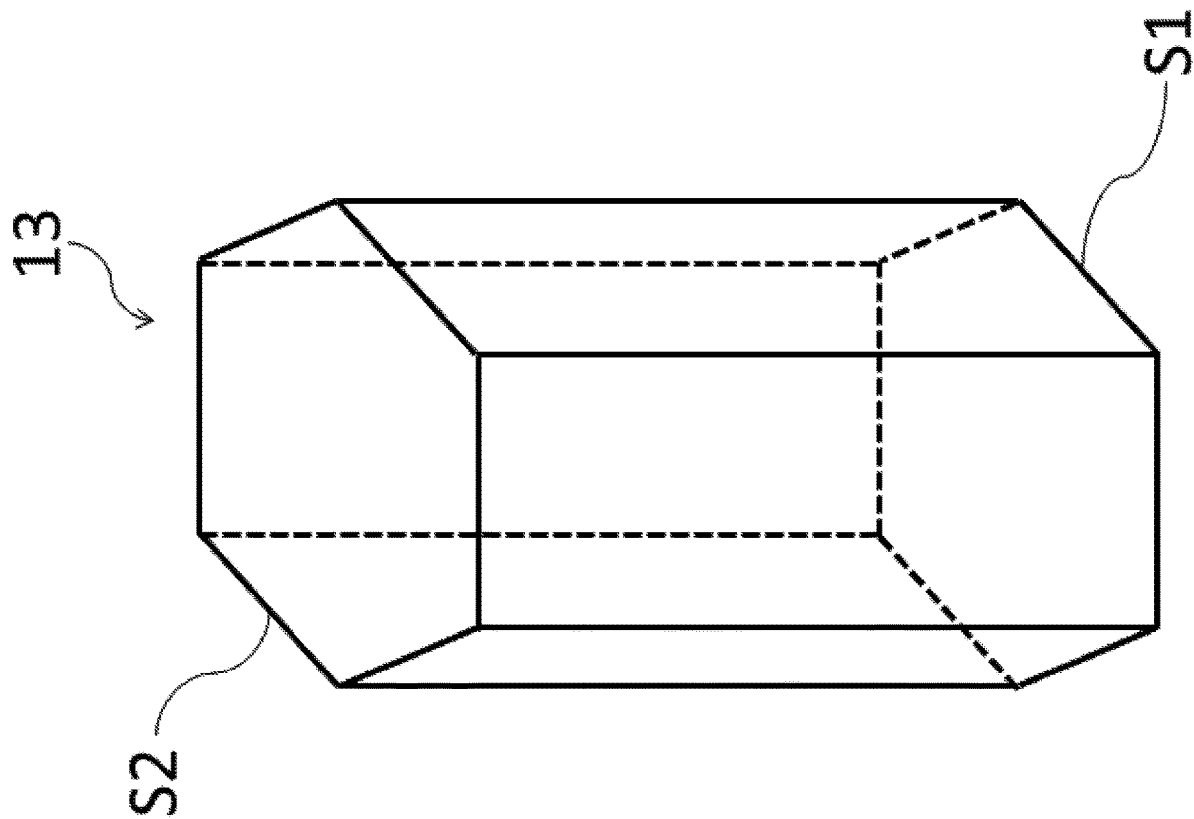
FIG. 10 is a diagram illustrating an overall shape of the die hole 13.

Also, as can be seen from FIG. 9, an inlet opening surface S2 (second opening surface) of the die hole 13 also has a polygonal shape. In the present embodiment, the shape of the opening surface S2 is congruent to that of the opening surface S1. Also, the opening surface S1 and the opening surface S2 completely overlap each other in a plan view. As a result, as shown in FIG. 10, a regular hexagonal prismatic space is present within the die hole 13.

Referring back to FIG. 4, the coating machine 20 is a machine for coating each of the granules (core portions 32) formed by the granulation machine 10 with a coating material (a material for forming a coating portion 34). The coating machine 20 forms a coating portion 34 by attaching a powdered coating material to the surface of each core portion 32. The attachment of the coating material may be performed by, for example, sprinkling or spraying the coating material. The coating material contains an adhesive material.

Figure 11:
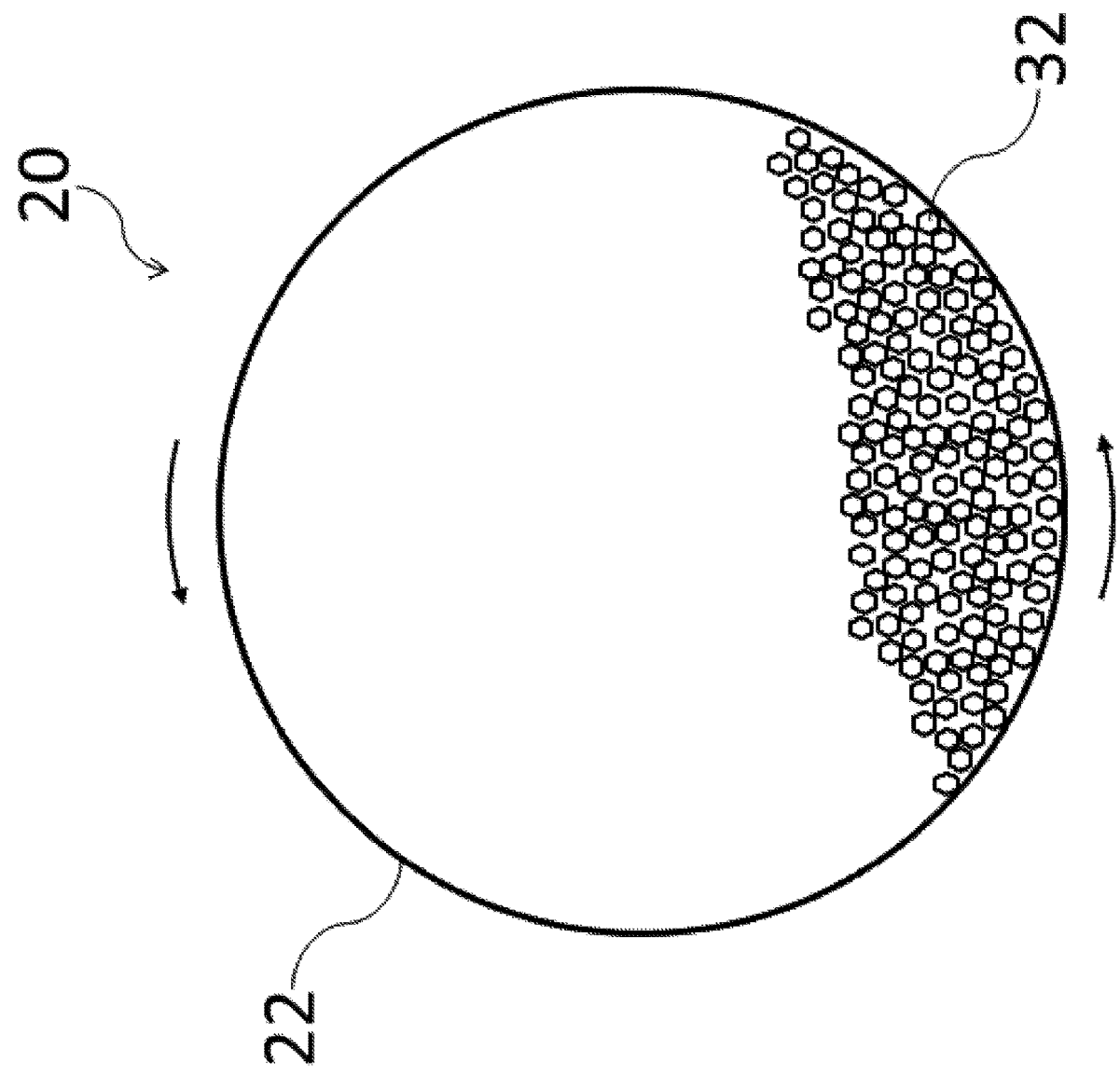
FIG. 11 is a diagram illustrating a structure of a coating machine 20.

As shown in FIG. 11, the coating machine 20 includes a drum 22 (container). The drum 22 has a substantially cylindrical shape, and is provided so as to be capable of rotating. Specifically, the drum 22 is rotatable about its central axis. The central axis of the drum 22 is horizontal. A plurality of core portions 32 formed by the granulation machine 10 are housed in the drum 22. The coating machine 20 attaches the coating material to the surface of each of the core portions 32 by rotating the drum 22 in which the core portions 32 are housed.

Next, a method for manufacturing an excrement treatment material according to an embodiment of the present invention will be described in conjunction with the operations of the manufacturing apparatus 1. The manufacturing method includes a granulation step and a coating step. The granulation step is a step of forming a granule (core portion 32) by performing extrusion granulation on a granulation material using the granulation machine 10. Prior to granulation, the granulation material is subjected to pre-treatment such as pulverization, kneading, and adding water, as needed.

Figure 12:
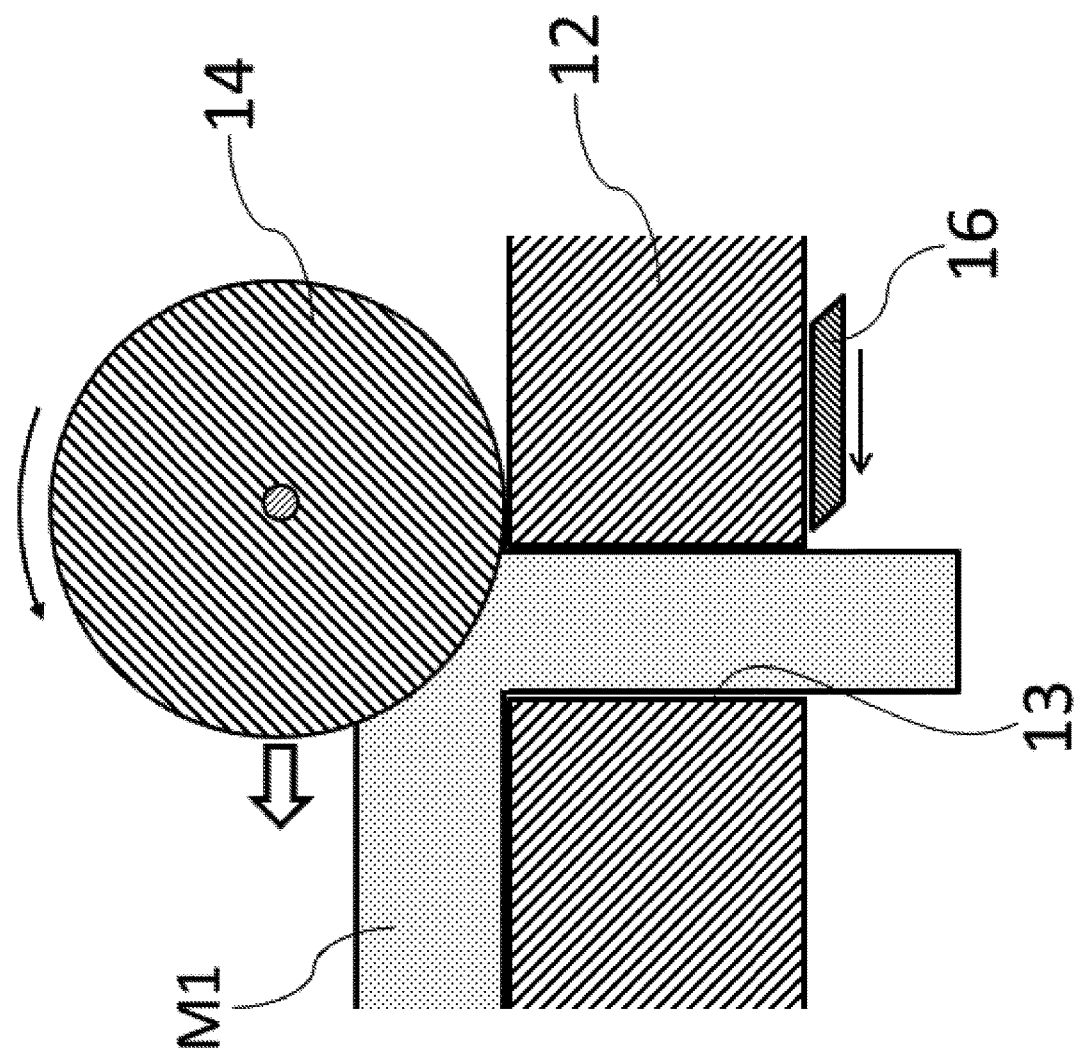
FIG. 12 is a diagram illustrating a granulation step of a method for manufacturing an excrement treatment material according to an embodiment of the present invention.
Figure 13:
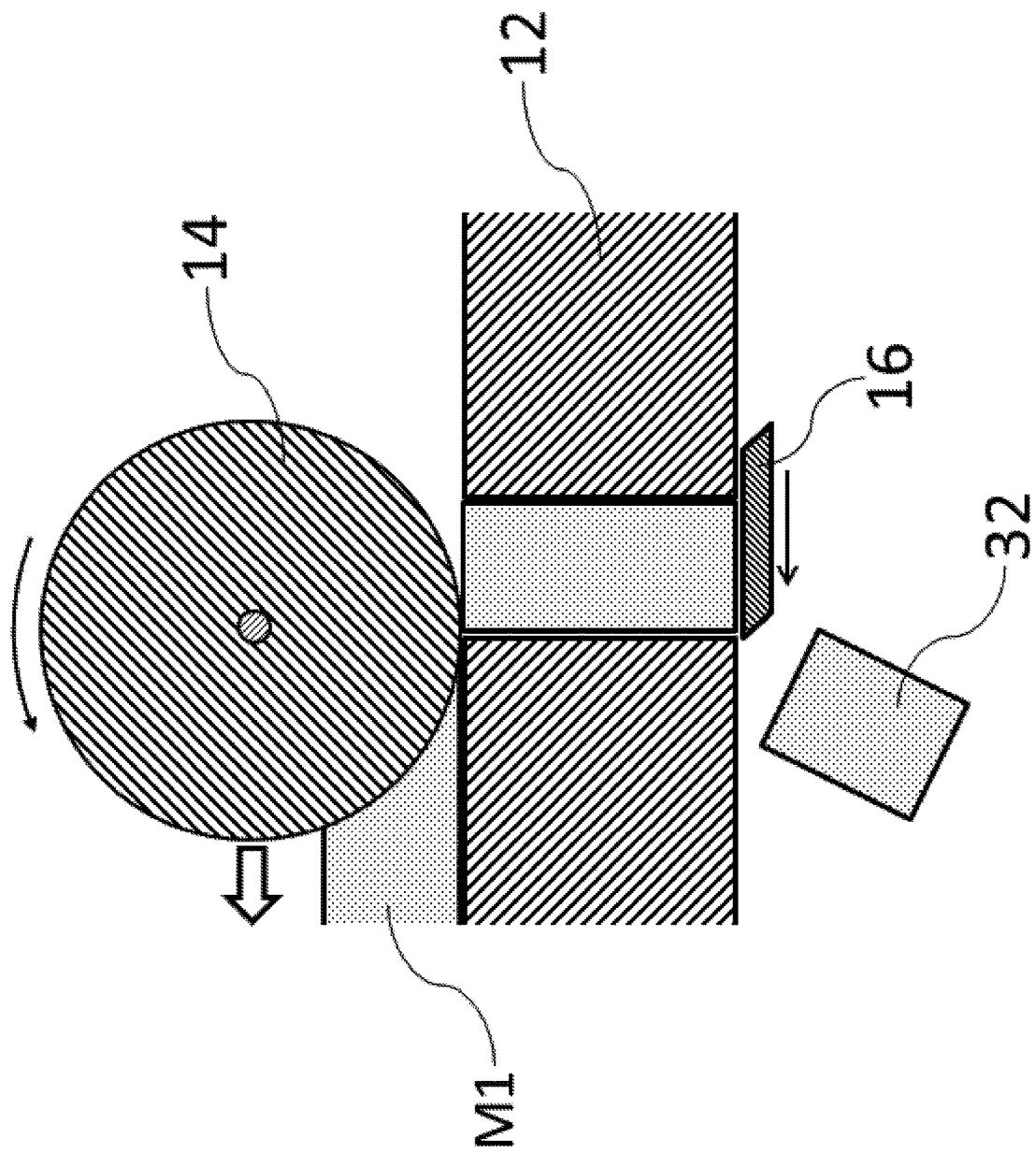
FIG. 13 is a diagram illustrating the granulation step of the method for manufacturing an excrement treatment material according to an embodiment of the present invention.

In the granulation step, as shown in FIG. 12, a granulation material M1 supplied on the front surface side of the die 12 is extruded into the die hole 13 by the roller 14 that rolls on the front surface of the die 12. The granulation material M1 pressed into the die hole 13 is extruded toward the back surface side of the die 12. At this time, because the outlet opening surface S1 of the die hole 13 has a polygonal shape, the granulation material M1 is molded into a rectangular prism shape and extruded through the die hole 13. During extrusion of the granulation material M1, on the back surface side of the die 12, the cutter 16 continues to rotate. Accordingly, the granulation material M1 extruded from the die hole 13 is cut by the cutter 16 as shown in FIG. 13. As a result, a core portion 32 that has a rectangular prism shape is obtained.

The coating step is a step of coating the granule (core portion 32) formed in the granulation step with a coating material. In the coating step, a plurality of core portions 32 formed in the granulation step are housed in the drum 22 (see FIG. 11), and thereafter the coating material is attached to the surface of each of the core portions 32 while rotating the drum 22. In this way, a coating portion 34 is formed on each core portion 32. Then, post-treatment such as sieving and drying is performed as needed. Through the above processing, an excrement treatment material 3 that is composed of a plurality of grains 30 is obtained.

Advantageous effects of the present embodiment will be described. In the present embodiment, a granulation machine 10 that includes a die 12 in which a die hole 13 is formed is used. The outlet opening surface S1 of the die hole 13 has a polygonal shape. Accordingly, from the granulation material that has passed through the die hole 13, a granule (core portion 32) that has a rectangular prism shape is obtained. As a result, in the manufactured excrement treatment material 3, grains 30 do not easily roll around on the floor. Accordingly, a method and apparatus 1 for manufacturing an excrement treatment material 3 that is composed of grains 30 that do not easily roll around on the floor are implemented.

The opening surface S1 of the die hole 13 has a regular polygonal shape. Accordingly, a core portion 32 having a regular rectangular prism shape is obtained, and thus the geometric symmetry of a grain 30 is increased. By increasing the symmetry of the grain 30 as described above, the appearance of the grain 30, eventually, the appearance of the excrement treatment material 3 can be improved.

In the case where the opening surface S1 of the die hole 13 has an n-gonal shape (where n is an integer of 5 or more), the internal angles are obtuse. By increasing the internal angles of the opening surface S1 as described above, it is possible to reduce the occurrence of a situation in which the granulation material is squeezed into the corners of the die hole 13 (in particular, the vicinity region of the opening surface S1).

The core portion 32 is coated with a coating material (coating portion 34) that contains an adhesive material. Accordingly, grains 30 that have absorbed excrement can be bonded to each other, and a clump composed of a plurality of used grains 30 can be formed. As a result of a clump of grains 30 being formed, used grains 30 can be selectively removed, with ease, from the excrement treatment material 3 in which unused grains 30 and used grains 30 are mixed.

During the coating step, the coating material is attached to the surface of each of the core portions 32 while rotating the drum 22 in which the core portions 32 are housed. By doing so, the coating material can be uniformly attached to the entire surface of each of the core portions 32. This is advantageous in enhancing the uniformity in the thickness of the coating portion 34.

In the case where the core portion 32 and the coating portion 34 contain an organic substance as the main material, it is possible to obtain grains 30 suitable for being disposed of through incineration. In this case, a clump of used grains 30 can be discarded as combustible trash, and it is therefore possible to improve convenience for a user.

Figure 14:
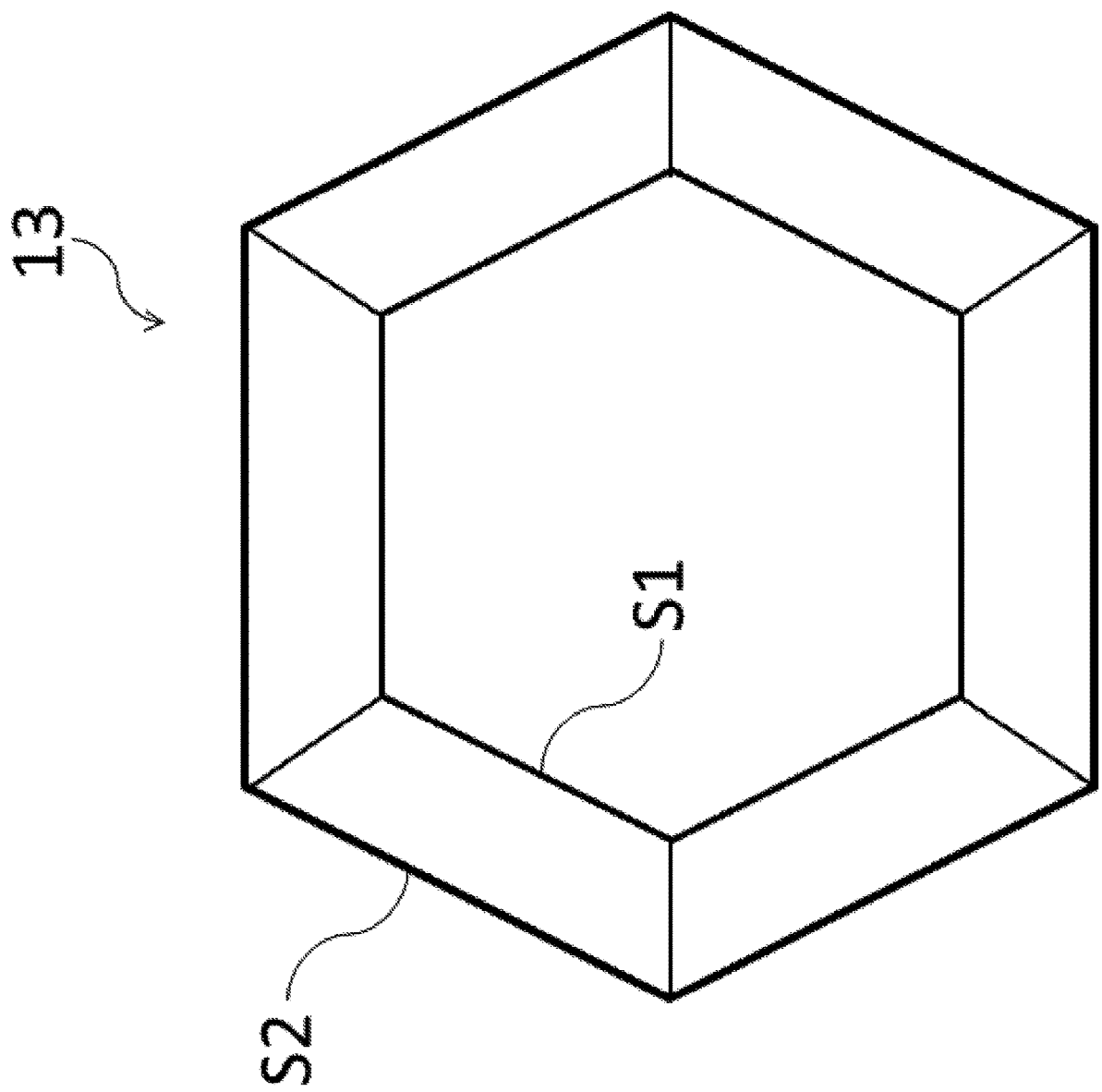
FIG. 14 is a plan view of a die hole 13 according to a variation.
Figure 15:
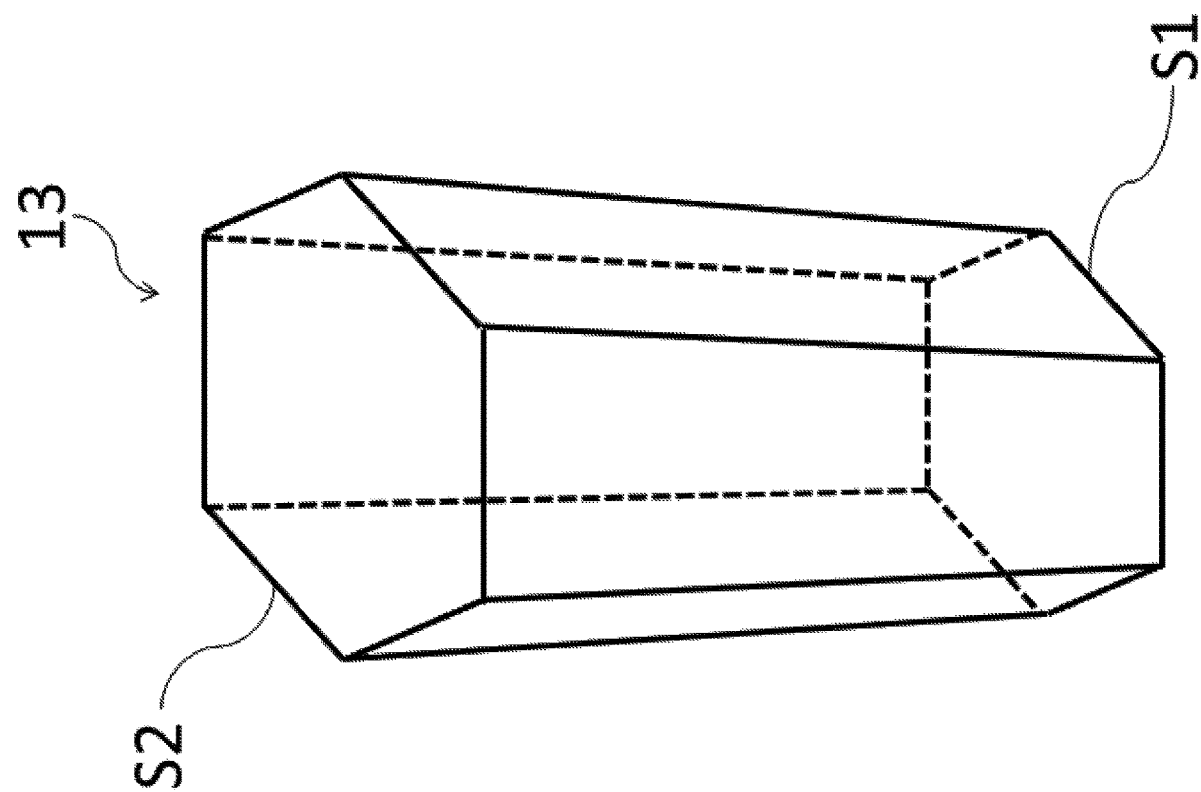
FIG. 15 is a diagram illustrating an overall shape of the die hole 13 shown in FIG. 14.

The present invention is not limited to the embodiment given above, and various modifications can be made. In the embodiment given above, an example has been described in which the opening surface S1 and the opening surface S2 of the die hole 13 have an equal area. However, the opening surface S1 and the opening surface S2 may have different areas, as shown in, for example, FIG. 14. In the diagram, the opening surface S1 has an area smaller than the area of the opening surface S2. The area of the transverse cross-section of the die hole 13 (a cross-section parallel to the front surface and the back surface of the die 12) decreases monotonously from the opening surface S2 toward the opening surface S1. The opening surface S1 and the opening surface S2 respectively correspond to the transverse cross-section at the outlet and the inlet of the die hole 13. Accordingly, as shown in FIG. 15, a rectangular frustum-shaped space is present within the die hole 13.

As described above, with the configuration in which the area of the outlet opening surface S1 of the die hole 13 is smaller than the area of the inlet opening surface S2 of the same, a high pressure can be easily applied to the granulation material extruded from the die hole 13. Also, with the configuration in which the area of the transverse cross-section of the die hole 13 decreases monotonously from the opening surface S2 toward the opening surface S1, the granulation material can more smoothly pass through the die hole 13.

Figure 16:
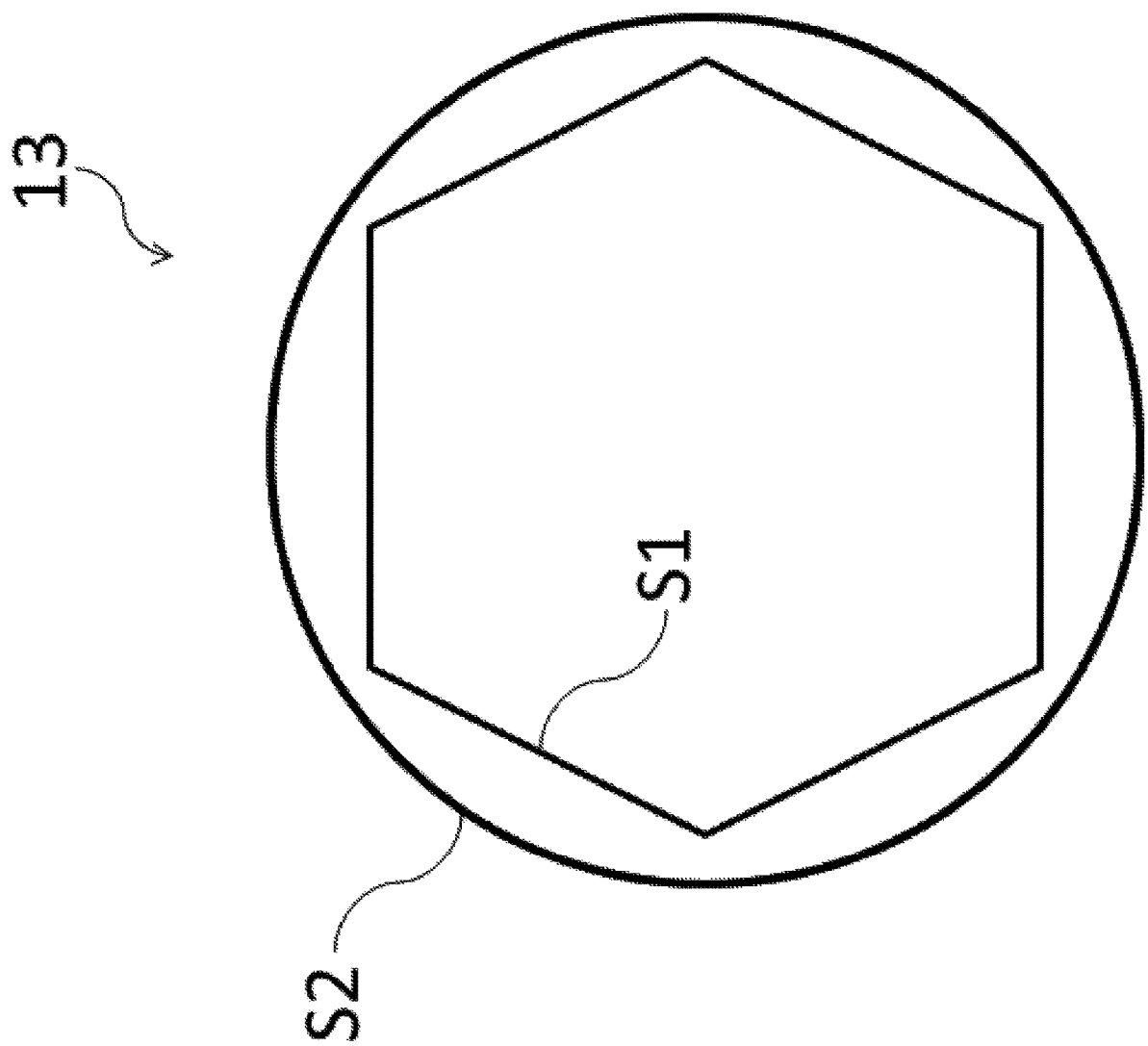
FIG. 16 is a plan view of a die hole 13 according to another variation.
Figure 17:
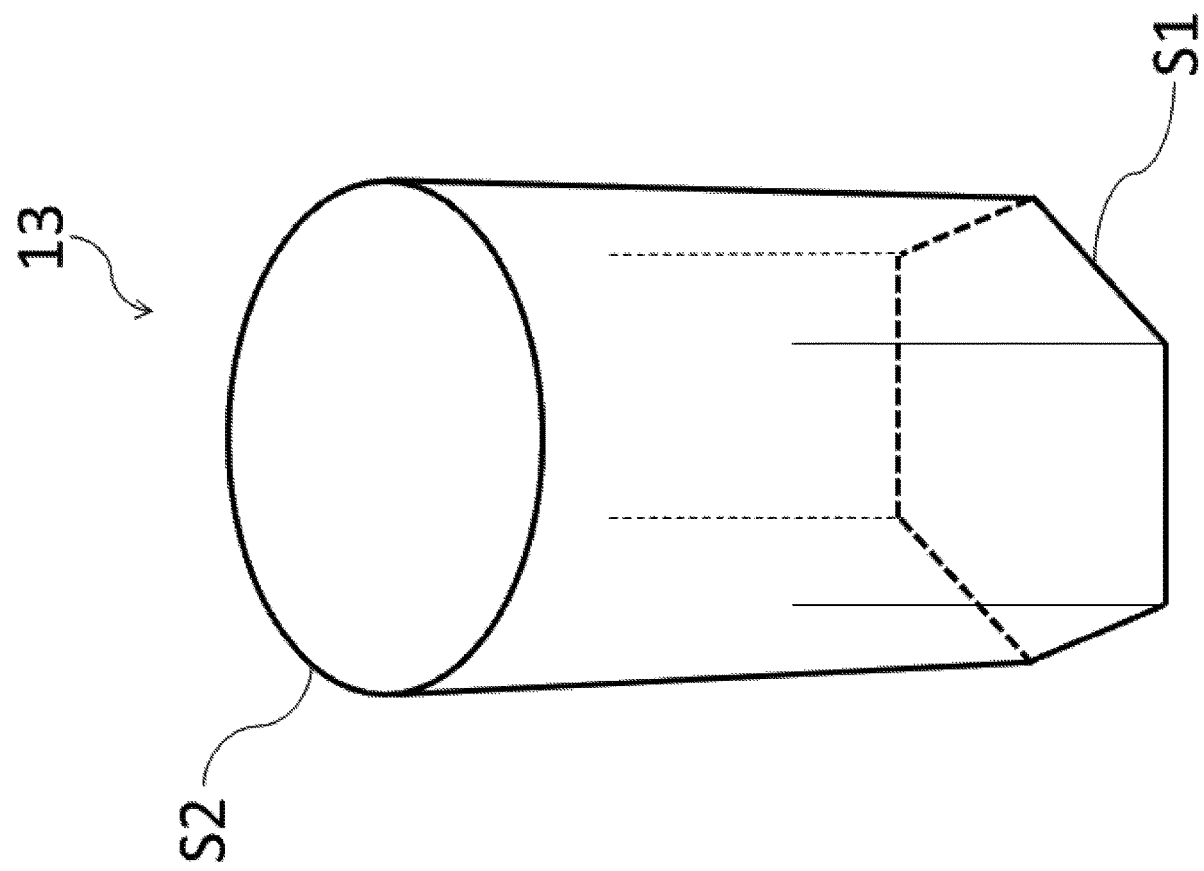
FIG. 17 is a diagram illustrating an overall shape of the die hole 13 shown in FIG. 16.

In the embodiment given above, an example has been described in which the opening surface S1 and the opening surface S2 of the die hole 13 have the same shape. However, the opening surface S1 and the opening surface S2 may have different shapes as shown in, for example, FIG. 16. In the diagram, the opening surface S1 has a polygonal shape, and the opening surface S2 has a circular shape. In this case as well, the area of the transverse cross-section of the die hole 13 decreases monotonously from the opening surface S2 toward the opening surface S1. As a result, as shown in FIG. 17, a space whose transverse cross-section continuously changes from the circular shape to the polygonal shape is present within the die hole 13.

As described above, by configuring the die hole 13 such that the inlet opening surface S2 has a non-angular shape (circular shape), the granulation material can flow particularly smoothly in the vicinity region of the opening surface S2. Accordingly, because the granulation material on the downstream side is pressed with a strong force, even when the outlet opening surface S1 has an angular shape (polygonal shape), it is possible to further reduce the occurrence of a situation in which the granulation material is squeezed into the corners of the die hole 13. The same effect can be obtained even when the opening surface S2 has an elliptical shape.

Figure 18:
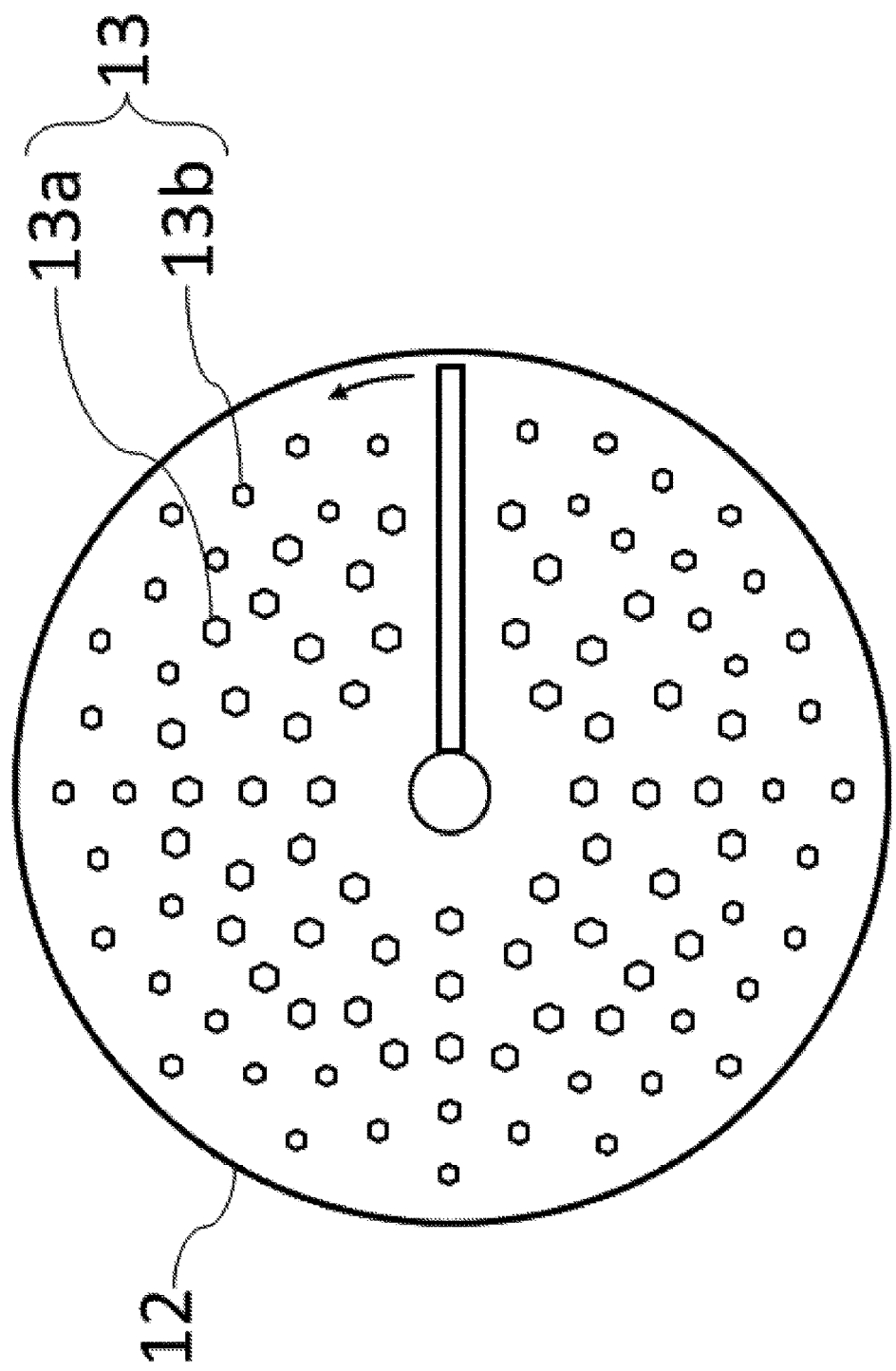
FIG. 18 is a bottom view illustrating die holes 13 according to another variation.
Figure 19:
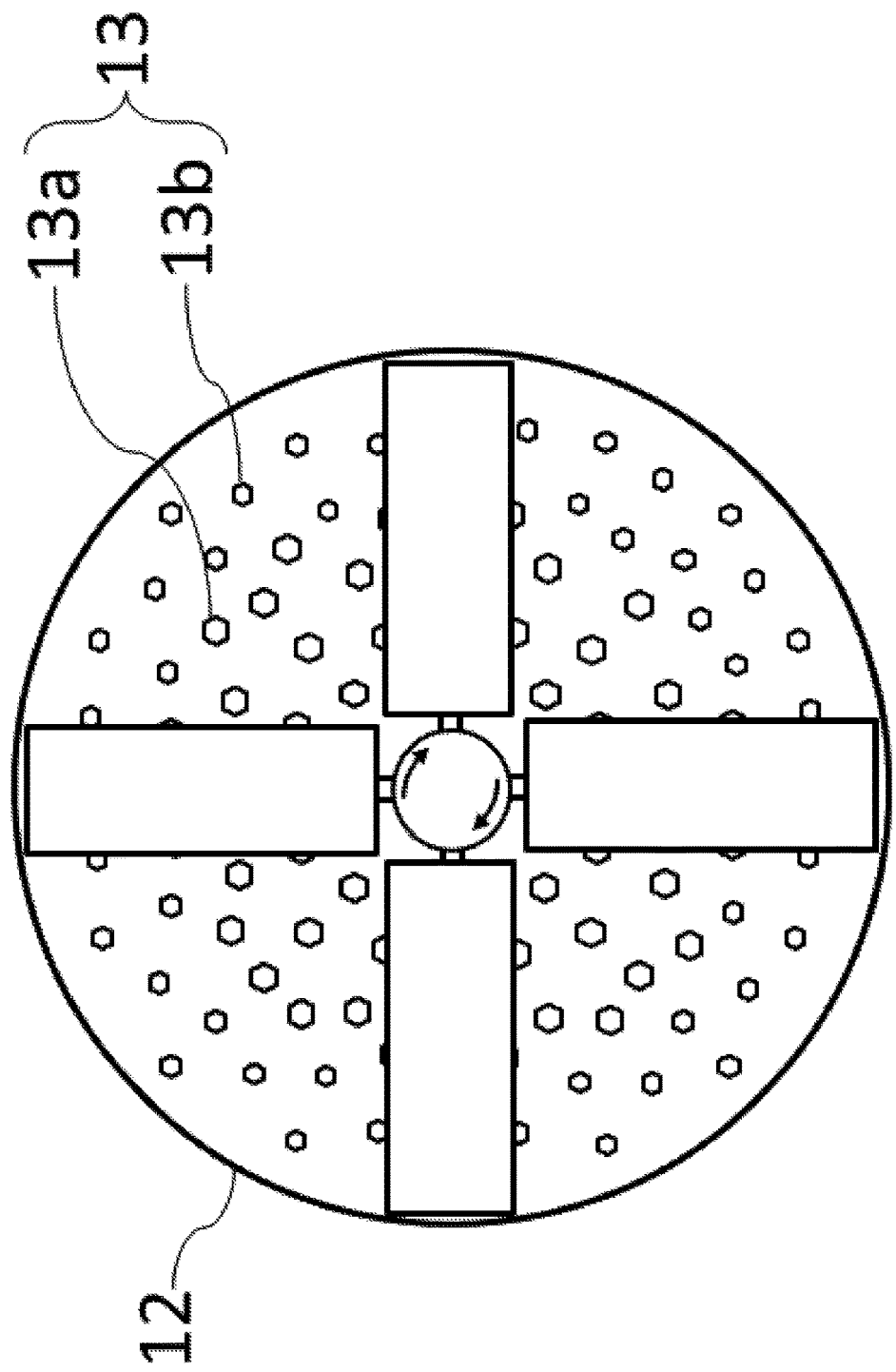
FIG. 19 is a plan view illustrating the die holes 13 according to another variation.

In the embodiment given above, an example has been described in which all die holes 13 formed in the die 12 have opening surfaces S1 of the same area. However, for example, as shown in FIGS. 18 and 19, a plurality of die holes 13 may include die holes 13a (first die holes) and die holes 13b (second die holes) whose opening surfaces S1 have different areas. As can be seen from FIG. 18, with respect to the outlet opening surface S1, the opening surface S1 of the die holes 13a has a larger area than that of the opening surface S1 of the die holes 13b. Also, as can be seen from FIG. 19, with respect to the inlet opening surface S2, the opening surface S2 of the die holes 13a has a larger area than that of the opening surface S2 of the die holes 13b. The die holes 13b are provided on the outer side of the die holes 13a in the radial direction of the die 12. In other words, the die holes 13b are provided at positions farther from the rotation axis 15 than the die holes 13a are. Accordingly, the areas of each of the opening surfaces S1 and S2 of the plurality of die holes 13 decrease monotonously as they are located away from the rotation axis 15.

In the granulation machine 10, the granulation material is pressed into the die holes 13 by the roller 14 that revolves about the rotation axis 15. In the case of this configuration, the pressing force of the roller 14 pressing the granulation material is weakened as the position is away from the rotation axis 15. In other words, a difference occurs in the pressing force of the roller 14 pressing the granulation material according to the distance from the rotation axis 15. Such a difference in the force causes variation in the hardness of the resulting core portions 32.

In this regard, in FIGS. 18 and 19, the die holes 13b are provided on the outer side of the die holes 13a in the radial direction of the die 12. If the strength of the pressing force pressing the granulation material is equal, the pressure applied to the granulation material increases as the area of the opening surface S1 of the die holes 13 is smaller. For this reason, the die holes 13b whose opening surface S1 has a relatively small area are provided at a position relatively far from the rotation axis 15 (a position where the pressing force pressing the granulation material is relatively weak), and the die holes 13a whose opening surface S1 has a relatively large area are provided at a position relatively close to the rotation axis 15 (a position where the pressing force pressing the granulation material is relatively strong). With this configuration, variation in the hardness of the core portions 32 can be reduced.

In the embodiment given above, an example has been described in which the granulation machine 10 includes a roller 14. However, the granulation machine 10 does not need to include a roller 14. In this case, the granulation material may be pressed into the die holes 13 by a known means other than the roller 14.

In the embodiment given above, an example has been described in which the granulation machine 10 includes a cutter 16. However, the granulation machine 10 does not need to include a cutter 16. In this case, the granulation material extruded from the die holes 13 may be cut by a known means other than the cutter 16.

In the embodiment given above, an example has been described in which each grain 30 has a multi-layer structure composed of a core portion 32 and a coating portion 34. However, it is not necessary to form the coating portion 34. That is, each grain 30 may have a single-layer structure composed only of a core portion 32. In this case, it is unnecessary to provide the coating machine 20, and the coating step is not executed.

In the embodiment given above, an example has been described in which the grains 30 are water-absorbent grains that absorb excrement. However, the grains 30 may be water-permeable grains that allow excrement to permeate therethrough. There are two types of water-permeable grains: grains that allow excrement to pass through the interior of the grains; and grains that allow excrement to pass through the gaps between the grains. An example of the latter grains is water-repellent grains.

LIST OF REFERENCE NUMERALS

1 Manufacturing apparatus
3 Excrement treatment material
10 Granulation machine
12 Die
13 Die hole
13a Die hole (first die hole)
13b Die hole (second die hole)
14 Roller
15 Rotation axis
16 Cutter
20 Coating machine
22 Drum
30 Grain
32 Core portion (granule)
34 Coating portion
S1 Outlet opening surface (first opening surface)
S2 Inlet opening surface (second opening surface)

The invention claimed is:

1. A method for manufacturing an excrement treatment material, the method comprising:
   a granulation step of forming a granule by performing extrusion granulation on a granulation material using a granulation machine,
   wherein:
      the granulation machine includes a die in which a die hole that allows the granulation material to pass therethrough is formed,
      a first opening surface that is an outlet opening surface of the die hole has a polygonal shape, and
      a second opening surface that is an inlet opening surface of the die hole has a circular shape or an elliptical shape.

2. The method for manufacturing an excrement treatment material according to claim 1,
   wherein the first opening surface has an area that is smaller than an area of the second opening surface.

3. The method for manufacturing an excrement treatment material according to claim 2,
   wherein an area of a transverse cross-section of the die hole decreases monotonously from the second opening surface toward the first opening surface.

4. The method for manufacturing an excrement treatment material according to claim 1,
   wherein the die is provided with a plurality of die holes including the die hole as a first die hole and a second die hole, and
   the first opening surface of the first die hole has an area larger than an area of a first opening surface of the second die hole.

5. The method for manufacturing an excrement treatment material according to claim 4,
wherein the second opening surface of the first die hole has an area larger than an area of a second opening surface of the second die hole.

6. The method for manufacturing an excrement treatment material according to claim 4,
wherein the granulation machine includes: a rotation axis that is positioned at a center portion of the die; and a roller that is configured to press the granulation material into each of the die holes while revolving about the rotation axis.

7. The method for manufacturing an excrement treatment material according to claim 6,
wherein the second die hole is provided at a position farther from the rotation axis than the first die hole is.

8. An apparatus for manufacturing an excrement treatment material, the apparatus comprising:
a granulation machine that includes a die in which a die hole that allows a granulation material to pass therethrough is formed, the granulation machine being configured to form a granule by performing extrusion granulation on the granulation material,
wherein:
a first opening surface that is an outlet opening surface of the die hole has a polygonal shape, and
a second opening surface that is an inlet opening surface of the die hole has a circular shape or an elliptical shape.

9. The apparatus for manufacturing an excrement treatment material according to claim 8,
wherein the first opening surface has a regular polygonal shape.

10. The apparatus for manufacturing an excrement treatment material according to claim 8,
wherein the first opening surface has an n-gonal shape, "n" being an integer of b 5 or more.

11. The apparatus for manufacturing an excrement treatment material according to claim 8,
wherein the first opening surface has an area that is smaller than an area of the second opening surface.

12. The apparatus for manufacturing an excrement treatment material according to claim 11,
wherein an area of a transverse cross-section of the die hole decreases monotonously from the second opening surface toward the first opening surface.

13. The apparatus for manufacturing an excrement treatment material according to claim 8,
wherein the die is provided with a plurality of die holes including a first die hole as the die hole and a second die hole, and
the first opening surface of the first die hole has an area larger than an area of a first opening surface of the second die hole.

14. The apparatus for manufacturing an excrement treatment material according to claim 13,
wherein the second opening surface of the first die hole has an area larger than an area of a second opening surface of the second die hole.

15. The apparatus for manufacturing an excrement treatment material according to claim 13,
wherein the granulation machine includes: a rotation axis that is positioned at a center portion of the die; and a roller that is configured to press the granulation material into each of the die holes while revolving about the rotation axis.

16. The apparatus for manufacturing an excrement treatment material according to claim 15,
wherein the second die hole is provided at a position farther from the rotation axis than the first die hole is.

17. The apparatus for manufacturing an excrement treatment material according to claim 8, comprising:
a coating machine that is configured to coat the granule formed by the granulation machine with a coating material.

18. The apparatus for manufacturing an excrement treatment material according to claim 17,
wherein the coating machine is configured to attach the coating material to a surface of the granule by rotating a container in which the granule formed by the granulation machine is housed.

* * * * *